(12) United States Patent
Luo et al.

(10) Patent No.: US 11,178,454 B2
(45) Date of Patent: Nov. 16, 2021

(54) VIDEO PLAYING METHOD AND DEVICE, ELECTRONIC DEVICE, AND READABLE STORAGE MEDIUM

(71) Applicant: BAIDU ONLINE NETWORK TECHNOLOGY (BEIJING) CO., LTD., Beijing (CN)

(72) Inventors: Yongxi Luo, Beijing (CN); Shasha Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/731,949

(22) Filed: Dec. 31, 2019

(65) Prior Publication Data
US 2021/0092481 A1 Mar. 25, 2021

(30) Foreign Application Priority Data
Sep. 19, 2019 (CN) .......................... 201910887365.3

(51) Int. Cl.
*H04N 21/442* (2011.01)
*G10L 15/22* (2006.01)
(Continued)

(52) U.S. Cl.
CPC ....... *H04N 21/44218* (2013.01); *G10L 15/22* (2013.01); *H04N 21/42203* (2013.01); *H04N 21/4858* (2013.01); *G10L 2015/223* (2013.01)

(58) Field of Classification Search
None
See application file for complete search history.

(56) References Cited

U.S. PATENT DOCUMENTS

2005/0172319 A1* 8/2005 Reichardt .............. H04N 21/47
725/52
2010/0009719 A1* 1/2010 Oh ......................... H04N 5/772
455/563
(Continued)

FOREIGN PATENT DOCUMENTS

EP 3010015 A1 4/2016
JP 2014532933 A 12/2014
(Continued)

OTHER PUBLICATIONS

European Patent Application No. 19219810.9 extended Search and Opinion dated Jul. 22, 2020, 8 pages.
(Continued)

*Primary Examiner* — James R Sheleheda
*Assistant Examiner* — Timothy R Newlin
(74) *Attorney, Agent, or Firm* — Lathrop GPM LLP

(57) ABSTRACT

The present application discloses a video playing method and device, an electronic device, and a readable storage medium The method includes: detecting a video playing operation in a target operation mode; in which, in the target operation mode, audio is consecutively collected to obtain an audio stream and an information stream is acquired; the information stream is obtained by performing speech recognition on the audio stream; providing a video playing interface in response to the video playing operation, to play a video on the video playing interface; in which, on the video playing interface, a first element is partially hidden and a second element is displayed, the first element is configured to indicate that the audio is consecutively acquired, and the second element is displayed based on the information stream.

12 Claims, 2 Drawing Sheets

--- acquiring final recognition information from the information stream after a period of time, when intermediate recognition information is acquired from the information stream; in which, the intermediate recognition information is obtained by performing the speech recognition on an audio of an incomplete sentence. and the final recognition information is obtained by performing the speech recognition on an audio of a complete — 301 recognizing an intention of the final recognition information — 302 determining the final recognition information as the target information, in response to determining that the intention matches the control intention — 303

(51) Int. Cl.
*H04N 21/422* (2011.01)
*H04N 21/485* (2011.01)

(56) References Cited

U.S. PATENT DOCUMENTS

| | | | | |
|---|---|---|---|---|
| 2010/0088100 | A1* | 4/2010 | Lindahl | G10L 15/30 704/270.1 |
| 2010/0312547 | A1* | 12/2010 | Van Os | G06F 3/167 704/9 |
| 2012/0038745 | A1* | 2/2012 | Yu | H04N 13/128 348/46 |
| 2012/0060092 | A1* | 3/2012 | Hill | H04N 21/4882 715/716 |
| 2013/0024197 | A1* | 1/2013 | Jang | H04N 21/4345 704/246 |
| 2013/0073293 | A1* | 3/2013 | Jang | G10L 15/22 704/275 |
| 2014/0207452 | A1* | 7/2014 | Klein | G06F 3/0304 704/235 |
| 2015/0040012 | A1* | 2/2015 | Faaborg | G06F 3/04817 715/728 |
| 2015/0309700 | A1* | 10/2015 | Li | G06F 3/04842 715/765 |
| 2016/0165271 | A1* | 6/2016 | Ardo | G06K 9/6215 725/32 |
| 2017/0026709 | A1* | 1/2017 | Tilaye | H04N 21/41 |
| 2017/0169817 | A1 | 6/2017 | VanBlon et al. | |
| 2018/0077469 | A1* | 3/2018 | Geduldig | H04N 21/8586 |
| 2018/0316948 | A1* | 11/2018 | Todd | H04N 21/4753 |
| 2019/0147874 | A1* | 5/2019 | Mai | G06F 21/6245 704/275 |
| 2019/0198019 | A1* | 6/2019 | Xu | G10L 15/1815 |

FOREIGN PATENT DOCUMENTS

| | | |
|---|---|---|
| JP | 2017530567 A | 10/2017 |
| KR | 20130016025 A | 2/2013 |
| KR | 20150146193 A | 12/2015 |
| KR | 20190088737 A | 7/2019 |

OTHER PUBLICATIONS

Japanese Patent Application No. 2019-238245 Office Action dated Mar. 2, 2021, 2 pages.
Japanese Patent Application No. 2019-238245 English translation of Office Action dated Mar. 2, 2021, 3 pages.
Korean Patent Application No. 10-2019-0175879 Office Action dated Jan. 15, 2021, 5 pages.
Korean Patent Application No. 10-2019-0175879 English translation of Office Action dated Jan. 15, 2021, 9 pages.

* cited by examiner

```
┌─────────────────────────────────────────────────────────────┐
│ detecting a video playing operation in a target operation    │
│ mode, in which, in the target operation mode, audio is       │  101
│ continuously acquired to obtain an audio stream, an          │
│ information stream is acquired, and the information stream is│
│ obtained by performing speech recognition on the audio stream│
└─────────────────────────────────────────────────────────────┘
                              ↓
┌─────────────────────────────────────────────────────────────┐
│ in response to the video playing operation, providing a      │
│ video playing interface to play a video on the video playing │
│ interface, in which, on the video playing interface, a first │  102
│ element is partially hidden and a second element is displayed│
│ in which the first element is configured to indicate that the│
│ audio is continuously acquired and the second element is     │
│ displayed based on the information stream                    │
└─────────────────────────────────────────────────────────────┘
```

Fig. 1

```
┌─────────────────────────────────────────────────────────────┐
│ obtaining target information carrying a control intention    │  201
│ from the information stream                                  │
└─────────────────────────────────────────────────────────────┘
                              ↓
┌─────────────────────────────────────────────────────────────┐
│ generating the second element based on the target            │  202
│ information in response to obtaining the target information  │
└─────────────────────────────────────────────────────────────┘
                              ↓
┌─────────────────────────────────────────────────────────────┐
│ displaying the second element on the video playing interface │  203
└─────────────────────────────────────────────────────────────┘
```

Fig. 2

```
┌─────────────────────────────────────────────────────────────┐
│ acquiring final recognition information from the information│
│ stream after a period of time, when intermediate recognition│
│ information is acquired from the information stream; in      │  301
│ which, the intermediate recognition information is obtained │
│ by performing the speech recognition on an audio of an       │
│ incomplete sentence, and the final recognition information is│
│ obtained by performing the speech recognition on an audio of │
│ a complete                                                   │
└─────────────────────────────────────────────────────────────┘
                              ↓
┌─────────────────────────────────────────────────────────────┐
│ recognizing an intention of the final recognition information│  302
└─────────────────────────────────────────────────────────────┘
                              ↓
┌─────────────────────────────────────────────────────────────┐
│ determining the final recognition information as the target  │  303
│ information, in response to determining that the intention   │
│ matches the control intention                                │
└─────────────────────────────────────────────────────────────┘
```

Fig. 3

VIDEO PLAYING METHOD AND DEVICE, ELECTRONIC DEVICE, AND READABLE STORAGE MEDIUM

CROSS REFERENCE TO RELATED APPLICATIONS

This application claims priority and benefits to Chinese Application No. 201910887365.3, filed on Sep. 19, 2019, the entire contents of which are incorporated herein by reference.

TECHNICAL FIELD

The present application relates to fields of artificial intelligence and voice recognition, and particularly, to a video playing method and device, electronic device, and a readable storage medium.

BACKGROUND

With the continuous developments of artificial intelligence technology and terminal technology, artificial intelligence products, e.g., electronic devices such as smart speakers and so on, have been continuously popularized such that a user can control an electronic device in voice to perform a control instruction.

SUMMARY

The present application provides a video playing method. The method includes:
detecting a video playing operation in a target operation mode; in which, in the target operation mode, audio is continuously acquired to obtain an audio stream and an information stream is acquired; in which, the information stream is obtained by performing speech recognition on the audio stream; and
providing a video playing interface in response to the video playing operation, to play a video on the video playing interface; in which, on the video playing interface, a first element is partially hidden and a second element is displayed, the first element is configured to indicate that the audio is continuously acquired and the second element is displayed based on the information stream.

The present application provides an electronic device. The electronic device includes:
at least one processor; and
a memory communicatively connected with the at least one processor;
in which, the memory is configured to store instructions executable by the at least one processor, the instructions are executed by the at least one processor such that the at least one processor is configured to execute the video playing method described above.

The present application provides a non-transitory computer-readable storage medium, having computer instructions stored thereon. The computer instructions are executed by a computer, such that the computer is configured to execute the video playing method described above.

BRIEF DESCRIPTION OF THE DRAWINGS

The drawings are used to better understand the present solution, and do not constitute limitations to the present application. The above and/or additional aspects and advantages of the present application will become apparent and more readily appreciated from the following descriptions of embodiments made in combination with the drawings, in which:

FIG. 1 is a flowchart illustrating a video playing method according to embodiments of the present application.

FIG. 2 is a flowchart illustrating a video playing method according to embodiments of the present application.

FIG. 3 is a flowchart illustrating a video playing method according to embodiments of the present application.

DETAILED DESCRIPTION

Figure 4:
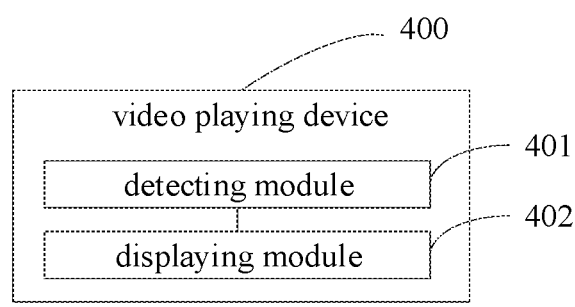
FIG. 4 is a block diagram illustrating a video playing device according to embodiments of the present application.

Example embodiments of the present application will be described in combination with the drawings below, wherein various details of embodiments of the present application are included to facilitate understanding, and they should be construed to be only examples. Therefore, those ordinarily skilled in the art should appreciate that, various alterations and modifications on the embodiments described herein may be carried out without departing from the spirit and scope of the present application. Also, for the sake of clarity and conciseness, descriptions of known functions and structures are omitted in the following descriptions.

At present, when a user is viewing a video using an electronic device, in a case where the user desires to interact with the electronic device, a voice acquiring icon, recognition information in response to user inputs, parsed intermediate recognition information, denied recognition information, prompt information may be presented on a video playing interface.

In this case, multiple elements are presented to occlude the video playing interface, thereby lowering immersive experience of the user when viewing a video.

Therefore, the present disclosure provides a video playing method, a video playing device, an electronic device, and a readable storage medium, which will be described with reference to the drawings below.

FIG. 1 is a flowchart illustrating a video playing method according to embodiments of the present application.

For example, the video playing method may be applicable to a video playing device. The video playing device may be integrated in an electronic device which may be configured to execute the video playing method.

The electronic device may be a personal computer (called PC for short), a cloud terminal device, a mobile device, a smart speaker, or the like. The mobile device may be, for example, a hardware device having various operating systems, touch screens and/or display screens, such as a phone, a tablet computer, a personal digital assistant, a wearable device, on-board device and the like.

As illustrated in FIG. 1, the video playing method may include the following.

At block 101, a video playing operation is detected in a target operation mode. In the target operation mode, audio is continuously acquired to obtain an audio stream such that an information stream is acquired. The information stream is obtained by performing speech recognition on the audio stream.

In an example, the target operation mode may be an operation mode having a listening state. In a case where the electronic device is in the target operation mode having the listening state, a user does not need to input a wake-up word in voice and may input a voice instruction in real time to interact with the electronic device. In the target operation mode, the electronic device may continuously acquire the audio to obtain the audio stream and perform the speech recognition on the audio stream to obtain the information stream. In this manner, in a case where the user desires to interact in real time or continuously with the electronic device, there is no need to frequently input the wake-up word, thereby simplifying user operations and improving user experience.

In an example, in a case where the electronic device is in the target operation mode, the video playing device may detect, by listening, whether the video playing operation is triggered. In a case where the video playing operation is triggered, a block 102 is performed. In a case where the video playing operation is not triggered, it continuous to acquire the audio to obtain the audio stream.

As an example, the video playing operation may be triggered by clicking a video file on a display interface of the electronic device or by receiving the video playing instruction input by the user in voice. For example, the user may input "I want to watch film A" in voice, such that the video playing instruction may be "playing film A". In response to detecting by the video playing device the voice inputted by the user and determining the video playing instruction, it may be determined that the video playing operation is detected.

At block 102, in response to the video playing operation, providing a video playing interface to play a video on the video playing interface. On the video playing interface, a first element is partially hidden and a second element is displayed. The first element is configured to indicate that the audio is consecutively acquired, and the second element is displayed based on the information stream.

In an example, in response to detecting, by the video playing device, the video playing operation, the video playing interface may be provided, to play the video on the video playing interface. On the video playing interface, the first element is partially hidden and the second element is displayed. The first element is configured to indicate that the audio is continuously acquired, and the second element is displayed based on the information stream. Therefore, in the target operation mode, in addition to the video playing interface, a part of the first element and the second element are presented on a screen of the electronic device, thereby reducing to occlude the video playing interface and improving an immersive viewing experience of the user. In addition, by displaying a part of the first element on the video playing interface, the user may know that the electronic device is in the listening state, such that the user may interact with the electronic device by inputting the voice control instruction, without repeatedly waking the electronic device up, thereby further improving the user experience.

As an example, in a case where the electronic device is in the target operation mode, when the user clicks a video file B displayed on the display interface of the electronic device, the electronic device may determine that the video playing operation is triggered. Therefore, the video file B may be played and the video playing interface may be provided. In addition, a part of the first element and the second element are displayed on the video playing interface, thereby reducing occlusion of the video playing interface and improving immersive viewing experience of the user.

As another example, in a case where the electronic device is in the target operation mode, when the user inputs the video playing instruction in voice, for example, the user inputs "I want to watch film A" in voice, the electronic device may determine that the video playing operation is triggered. The film A may be played and the video playing interface may be provided. In addition, a part of the first element is displayed on the video playing interface, such that the user may know that the electronic device is in the listening state. The user may interact with the electronic device by inputting a control instruction in voice, without repeatedly waking the electronic device up. For example, when the video playing interface is being provided, the user may input "louder" in voice if the user wants to adjust the volume. In addition, the user may input "what's the weather today" in voice if the user wants to query the weather. That is, the user may interact with the electronic device, without inputting the wake-up word.

With the video playing method according to embodiments of the present application, the video playing operation is detected in the target operation mode; In the target operation mode, the audio is continuously acquired to obtain the audio stream and the information stream is acquired. The information stream is obtained by performing the speech recognition on the audio stream. The video playing interface is provided in response to the video playing operation, to play the video on the video playing interface. On the video playing interface, the first element that is configured to indicate that the audio is continuously acquired is partially hidden, and the second element is displayed based on the information stream. In this manner, in the target operation mode, in addition to the video playing interface, a part of the first element and the second element are displayed on the screen of the electronic device, thereby reducing occlusion of the video playing interface and improving immersive viewing experience of the user. In addition, by displaying the part of the first element on the video playing interface, the user may determine that the electronic device is listening, such that the user may input the control instruction or the interaction demand in voice, without repeatedly waking up the electronic device, which may further improve user experience.

It should be noted that, in a case where the electronic device is in a non-target operation mode, the user may control, in voice or manually, the electronic device to be switched to the target operation mode. For example, after inputting the wake-up word, the user may input "enter the target operation mode" in voice. In another example, the user may set the operation mode of the electronic device to the target operation mode on a setting interface. In addition, in a case where the electronic device is in the non-target operation mode, the user may trigger a target operation carrying a set control intention to switch the electronic device from the non-target operation mode to the target operation mode. The present application is not limited to the above. The set control intention may be set in advance by a built-in program of the electronic device, or in order to improve flexibility and applicability of the method, the set control intention may be set by the user, and the present application is not limited thereto. For example, the set control intention may be "playing an audio/video", "querying weather", etc.

As a possible implementation, in a case where the electronic device is in the non-target operation mode, in response to acquiring the wake-up word, an audio clip following the wake-up word may be obtained and an intention of the audio clip may be acquired. In response to determining that the intention of the audio clip is the set control intention, it may be determined that the target operation carrying the set control intention is detected. In this case, a control instruction corresponding to the target operation may be executed and the operation mode of the electronic device may be switched from the non-target operation mode to the target operation mode.

In detail, in a case where the electronic device is in a non-target operation mode, the electronic device may detect whether the wake-up word is inputted. In response to detecting that the wake-up word is input, the audio clip following the wake-up word may be acquired and the speech recognition may be performed on the audio clip using speech recognition technology to determine text information corresponding to the audio clip. Semantic recognition may be performed on the text information to determine the intention of the audio clip. As an example, the audio clip may be "I want to listen to a song", such that the intention of the audio clip may be "listening to a song" or "playing an audio". In response to determining that the intention of the audio clip matches the set control intention, it may be determined that the target operation is detected. In response to determining that the intention of the audio clip does not match the set control intention, it may be determined that no target operation is detected.

As an example, the electronic device may be a smart speaker and the set control intention may be "playing an audio/video". When the user inputs "Xiaodu Xiaodu, I want to listen to a song" in voice, the smart speaker may determine that the intention corresponding to the audio clip "I want to listen to a song" is "playing an audio", after acquiring and recognizing the audio data inputted by the user. In this case, it may be determined that the intention of the audio clip matches the set control intention. The song may be played and the operation mode of the electronic device may be switched from the non-listening state to the listening state such that the user may continuously interact with the smart speaker, for example inputting "a next song", "stop playing" and so on. Therefore, human-machine dialogues may be natural and real, thereby improving immersive experience of the user.

As another example, the electronic device may be the smart speaker and the set control intention may be "playing a next one". When the user is listening to a song, if the user inputs "Xiaodu Xiaodu, play a next one" in voice, the smart speaker may determine that the intention of the audio clip matches the set control intention. Therefore, the next song may be played and the operation mode of the electronic device may be switched from the non-listening state to the listening state, such that the user may continuously interact with the smart speaker.

When the user has a requirement for performing real-time interaction or consecutive interaction with the electronic device, there is no need to repeatedly input the wake-up. In response to determining that the audio data inputted in voice satisfies the set control intention, real-time interaction with the electronic device may be achieved, thereby simplifying user operations and improving user experience.

As another possible implementation, the electronic device may be in the non-target operation mode. In response to detecting the touch control operation which is an operation to play an audio/video, the touch control operation may be determined as the target operation carrying the set control intention. The touch control operation may be a click operation, a selection operation, an input operation, etc.

In the present application, in a case where the electronic device is in the non-target operation mode, in response to detecting that the touch control operation is the operation to play an audio/video, for example, the user clicks an audio/video on the display interface of the electronic device, it may be determined that the touch control operation is the target operation carrying the set control intention. That is, the set control intention is playing an audio/video. In response to detecting that the touch control operation is not the operation to play an audio/video, for example, the user edits a message, posts a message, modifies information, it may be determined that the touch control operation is not the target operation carrying the set control intention. That is, in the present application, in a case where the touch control operation carries the set control intention, it may be determined that the touch control operation is the target operation. In this case, it may be determined that the user has a requirement for real-time interaction or continuous interaction such that subsequent actions may be performed. In a case where the touch control operation does not carry the set control intention, it is determined that the touch control operation is not the target operation. In this case, it may be determined that the user does not have the requirement for real-time interaction or continuous interaction. The electronic device may keep the non-target operation mode.

As an application scenario, the electronic device may be a smart speaker. In response to detecting that the user clicks a video file on the display interface, it may be determined that the touch operation triggered by the user is a target operation carrying a control intention. The video file may be played and the operation mode of the electronic device may be switched from the non-listening state to the listening state, such that the user may continuously interact with the smart speaker.

When the user has the requirement for performing real-time interaction or continuous interaction with the electronic device, there is no need to frequently input the wake-up word. By triggering the operation to play an audio/video, a real-time interaction with the electronic device may be achieved, thereby simplifying user operations and improving uses experience.

It should be noted that, when the video is being played, the user may not speak or the user may talk to other users. In this case, displaying the information stream that is obtained by recognizing the video stream on the video playing interface, viewing experience of the user will be poor. Thus, as a possible implementation of the present application, in order to further reduce occlusion of the video playing interface to improve the immersive viewing experience, a valid information stream may be displayed on the video playing interface while ignoring an invalid information stream. Description of the above process will be made below.

FIG. 2 is a flowchart illustrating a video playing method according to embodiments of the present application.

As illustrated in FIG. 2, based on FIG. 1, providing the video playing interface may include the following.

At block 201, target information carrying a control intention is obtained from the information stream.

In an example, the information stream may be semantically recognized to determine whether the information stream carries a control intention. In a case where the information stream carries the control intention, the target information carrying the control intention may be obtained from the information stream. In a case where the information stream does not carry the control intention, the information stream may be ignored.

As an example, the information stream may be empty and may not carry any text information, indicating that the user does not speak. In addition, the information stream may be semantically incoherent, such that it is unable to recognize the control intention. Furthermore, the information stream may not carry any control intention even if the information stream is semantically coherent. For example, the information stream is "Xiaoming, when the meeting will be held in the afternoon?". The above information stream carries text information when the user talks to other users and does not carry any control intention. In this case, the above information stream may be ignored. That is, the second element is not displayed on the video playing interface, to reduce occupation of interface.

At block 202, in response to obtaining the target information, the second element is generated based on the target information.

At block 203, the second element is displayed on the video playing interface.

In the present application, in response to obtaining the target information, the second element may be generated based on the target information and displayed on the video playing interface. As an example, the information stream may be "this song is not OK, and play a next one". Therefore, the control intention may be "playing a next one" and the target information may be "a next one". In this case, words of "a next one" may be displayed on the video playing interface to reduce occlusion of the video playing interface. In addition, it is possible to execute the control instruction corresponding to the target information, i.e., to play a next song to satisfy an actual control demand of the user.

With the video playing method according to embodiments of the present application, the target information carrying the control intention is obtained from the information stream. The second element is generated based on the target information, in response to obtaining the target information. The second element is displayed on the video playing interface. In this manner, occlusion of the video playing interface may be reduced, thereby improving immersive viewing experience of the user.

It should be noted that, at present, when the information stream is obtained by recognizing the audio stream, intermediate recognition information, denied recognition information or invalid recognition information may be displayed on the video playing interface, such that the occlusion of the video playing interface may be increased.

However, with the video playing method according to embodiments of the present application, the second element generated based on the target information carrying the control intention is displayed on the video playing interface, to reduce the occlusion of the video playing interface. In addition, in response to recognizing the target information, the target information is obtained by recognizing the audio of an incomplete sentence in the audio stream, thereby reducing the occupation of computation resources and improving accuracy of intention recognition. Description of the above process will be made below.

FIG. 3 is a flowchart illustrating a video playing method according to embodiments of the present application.

As illustrated in FIG. 3, based on FIG. 2, the block 201 may include the following.

At block 301, final recognition information is acquired from the information stream after a period of time when intermediate recognition information is acquired from the information stream. The intermediate recognition information is obtained by performing the speech recognition on an audio of an incomplete sentence; and the final recognition information is obtained by performing the speech recognition on an audio of a complete sentence.

In an example, the information stream may be semantically recognized to determine whether the information stream has the intermediate recognition information. The intermediate recognition information is obtained by performing the speech recognition on the audio of the incomplete sentence. That is, the intermediate recognition information is semantically incoherent. In this case, the final recognition information may be acquired from the information stream after the period of time. The final recognition information is obtained by performing the speech recognition on the audio of the complete sentence. That is, the final recognition information is semantically coherent.

At block 302, an intention of the final recognition information is recognized.

At block 303, the final recognition information is determined as the target information, in response to determining that the intention recognized matches the control intention.

In an example, the control intention may be executable by the electronic device. The electronic device may have a control intention library which has various control intentions executable by the electronic device stored therein. In order to improve flexibility and applicability of the method, the control intention library may be dynamically modified and supplemented. For example, the user may add or remove a control intention based on the user's demand, and the present application is not limited thereto.

In an example, in response to determining that the intention of the final recognition information matches the control intention executable by the electronic device, the final recognition information may be determined as the target information. In this manner, the intention of the final recognition information is recognized, to reduce the occupation of computation resources and improve the accuracy of intention recognition.

As a possible implementation, when the video playing interface is presented in response to the video playing operation, a position of displaying the first element on the video playing interface may be set, for partial hiding. For example, the position of displaying the first element on the video playing interface may be set to an un-highlighted display position of the interface, to avoid disturbance to the user. For example, the position may be a lower left corner or a lower right corner of the interface. The first element may be displayed on the video playing interface based on the position. In this manner, a part of the first element is displayed on the video playing interface, such that the user may determine that the electronic device is listening. The user may input a control instruction or an interaction demand in voice, without repeatedly waking up the electronic device, thereby further improving the user experience.

As a possible implementation, the first element may include a body region and a halo region surrounding the body region. On the video playing interface, the body region and a part of the halo region are hidden. Therefore, a part of the halo region may be displayed on the video playing interface, to reduce the occupation of interface resources and the user may know that the electronic device is listening, by displaying the part of the halo region, e.g., a colorful halo region, on the video playing interface. Therefore, the control instruction or the interaction demand may be inputted in voice, without repeatedly waking up the electronic device, thereby improving the user experience.

In other words, in the target operation mode, a part of the halo region is displayed on the video playing interface to reduce the occupation of the video playing interface. In the non-target operation mode, the body region may be displayed or the body region and the halo region may be displayed to completely display the first element. Therefore, the user may view the first element easily and know that electronic device is listening based on the first element.

As a possible implementation, in order to further reduce the occlusion of the video playing interface, in the present application, an element for presenting a guide word may be hidden on the video playing interface, in response to the video playing operation. The guide word may be configured to indicate the control intention executable.

In the present application, the part of the first element and the second element indicating the control intention may be displayed on the video playing interface. The electronic device may directly execute the control intention according to the second element, without needing to display the control intention, thereby reducing the occlusion of the video playing interface, to improve user experience.

To implement the above, the present application further provides a video playing device.

FIG. 4 is a block diagram illustrating a video playing device according to embodiments of the present application.

As illustrated in FIG. 4, the video playing device 400 may include a detecting module 401 and a displaying module 402.

The detecting module 401 may be configured to detect a video playing operation in a target operation mode. In the target operation mode, audio is continuously acquired to obtain an audio stream, and an information stream is acquired. The information stream is obtained by performing speech recognition on the audio stream.

The displaying module 402 may be configured to provide a video playing interface, in response to the video playing operation, and to play a video on the video playing interface. On the video playing interface, a first element is partially hidden and a second element is displayed. The first element is configured to indicate that the audio is continuously acquired, and second element is displayed based on the information stream.

As a possible implementation, the displaying module 402 may be further configured to obtain target information carrying a control intention from the information stream; generate the second element based on the target information in response to obtaining the target information; and display the second element on the video playing interface.

As another possible implementation, the displaying module 402 may be further configured to acquire final recognition information from the information stream after a period of time, when intermediate recognition information is acquired from the information stream. The intermediate recognition information is obtained by performing the speech recognition on an audio of an incomplete sentence, and the final recognition information is obtained by performing the speech recognition on an audio of a complete sentence. In addition, the displaying module 402 is further configured to recognize an intention of the final recognition information, and determine the final recognition information as the target information, in response to determining that the intention matches the control intention.

As another possible implementation, the displaying module 402 may be further configured to set a position of displaying the first element on the video playing interface, in response to the video playing operation, for partial hiding; and display the first element on the video playing interface based on the position.

The first element includes a body region and a halo region surrounding the body region. On the video playing interface, the body region and a part of the halo region are hidden.

As another possible implementation, the displaying module 402 is further configured to hide an element for displaying a guide word on the video playing interface in response to the video playing operation. Thee guide word is configured to indicate a control intention executable.

It should be noted that, the descriptions of the video playing method may be also applied to the video playing device, and no repeated description will be made herein.

With the video playing device according to embodiments of the present application, the video playing operation is detected in the target operation mode. In the target operation mode, the audio is continuously acquired to obtain the audio stream, and the information stream is acquired. The information stream is obtained by performing the speech recognition on the audio stream. The video playing interface is provided in response to the video playing operation, to play a video on the video playing interface. On the video playing interface, the first element is partially hidden and the second element is displayed. The first element is configured to indicate that the audio is continuously acquired, and the second element is displayed based on the information stream. In this manner, in the target operation mode, in addition to the video playing interface, a part of the first element and the second element are presented on the screen of the electronic device, thereby reducing the occlusion of the video playing interface and improving immersive viewing experience of the user. In addition, the part of the first element is displayed on the video playing interface, such that the user may determine that the electronic device is listening. The control instruction or the interaction demand may be inputted in voice, without needing to repeatedly wake up the electronic device, thereby improving user experience.

To implement the above, the present application further provides an electronic device. The electronic device includes at least one processor; and a memory communicatively connected with the at least one processor. The memory is configured to store instructions executable by the at least one processor. The instructions are executed by the at least one processor such that the at least one processor is configured to execute the video playing method described above.

To implement the above, the present application further provides a non-transitory computer-readable storage medium, having computer instructions stored thereon. The computer instructions are executed by a computer, such that the computer is configured to implement the video playing method described above.

According to the present application, the present application further provides an electronic device and a readable storage medium.

Figure 5:
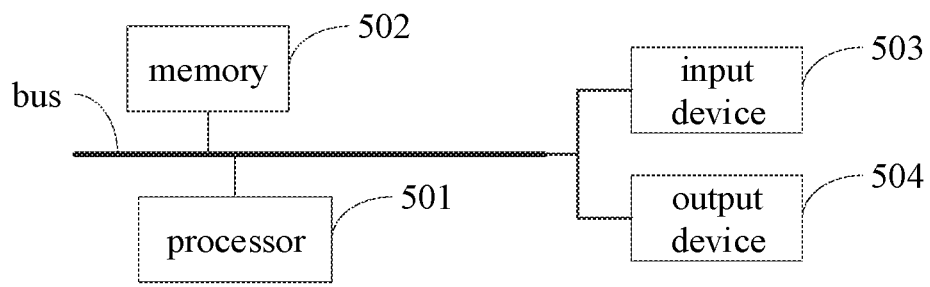
FIG. 5 is a block diagram illustrating an electronic device according to embodiments of the present application.

FIG. 5 is a block diagram illustrating an electronic device for implementing a video playing method according to embodiments of the present application. The electronic device is intended to represent digital computers in various forms, such as a laptop computer, a desktop computer, a workbench, a personal digital assistant, a server, a blade server, a large-scale computer and other suitable computers. The electronic device may also represent mobile devices in various forms, such as a personal digital assistant, a cellular phone, a smart phone, a wearable device and other similar computation devices. The components, their connection and relation and their functions as shown herein are only examples, but are not intended to limit the implementations of the present application as described and/or required herein.

As illustrated in FIG. 5, the electronic device includes one or more processors 501, a memory 502, and an interface for connecting respective components, including a high-speed interface and a low-speed interface. The respective components are connected to each other using different buses, and may be mounted on a common mainboard or mounted in other manners according to needs. The processor may perform processing on instructions executed within the electronic device, including instructions stored in or on the memory to display graphical information of GUI on an external input/output device (e.g., a display device coupled to the interface). In other implementations, a plurality of processors and/or a plurality of buses may be used together with a plurality of memories, if needed. Also, a plurality of electronic device may be connected, the respective device providing some essential operations (for example, serving as a server array, a group of blade servers, or a multi-processor system). FIG. 5 takes one processor 501 as an example.

The memory 502 is the non-transitory computer-readable storage medium provided by the present application. Wherein, the memory has stored therein instructions executable by at least one processor, to cause the at least one processor to implement the video playing method provided by the present application. The non-transitory computer-readable storage medium according to the present application stores computer instructions that are used for causing a computer to implement the video playing method provided by the present application.

The memory 502, as a non-transitory computer-readable storage medium, may be used for storing non-transitory software programs, and non-transitory computer-executable programs and modules, e.g., the program instructions/modules (e.g., the detection module 401 and the presentation module 402 as shown in FIG. 4) corresponding to the video playing method in the embodiments of the present application. The processor 501 implements various function applications and data processing of the server, i.e., implements the video playing method in the above method embodiments of the present application, by running the non-transitory software programs, instructions and modules stored in the memory 502.

The memory 502 may include a program storage region and a data storage region, wherein the program storage region may store application programs needed by an operating system and at least one function; the data storage region may store data created according to use of the electronic device, etc. Further, the memory 502 may include a high-speed random access memory, and may further include a non-transitory memory, e.g., at least one magnetic disk storage device, a flash memory device, or other non-transitory solid-state storage devices. In some embodiments, the memory 502 optionally includes memories arranged remotely with respect to the processor 501, and these remote memories may be connected to the electronic device over a network. Instances of the above network include, but are not limited to, the internet, the intranet, the local area network, the mobile communication network and their combinations.

The electronic device may further include an input device 503 and an output device 504. The processor 501, the memory 502, the input device 503 and the output device 504 may be connected via buses or in other manners, and FIG. 5 takes the connection via buses as an example.

The input device 503 may receive digital or character information which is inputted, and generate key signal inputs related to user setting and function control of the electronic device, for example, may be an input device such as a touch screen, a small keypad, a mouse, a trackpad, a touchpad, an indication rod, one or more mouse buttons, a trackball, a joystick and the like. The output device 504 may include a display device, an auxiliary lighting device (e.g., an LED) and a tactile feedback device (e.g., a vibrating motor), etc. The display device may include, but is not limited to, a liquid crystal display (LCD), a light emitting diode (LED) display and a plasma display. In some implementations, the display device may be a touch screen.

The various implementations of the system and technology described herein may be realized in a digital electronic circuit system, an integrated circuit system, an ASIC (application-specific integrated circuit), computer hardware, firmware, software and/or their combinations. The various implementations may include: implementing in one or more computer programs, wherein the one or more computer programs may be executed and/or interpreted on a programmable system including at least one programmable processor, and the programmable processor may be an application-specific or general-purpose programmable processor, and may receive data and instructions from a storage system, at least one input device and at least one output device and output the data and the instructions to the storage system, the at least one input device and the at least one output device.

These computer programs (also called programs, software, software applications, or codes) include machine instructions of a programmable processor. Moreover, an advanced process and/or an object-orientated programming language, and/or an assembly/machine language may be used to implement these computer programs. As used herein, both terms "machine-readable medium" and "computer-readable medium" refer to any computer program product, apparatus and/or device (e.g., magnetic disk, compact disk, memory, programmable logic device (PLD)) for supplying machine instructions and/or data to a programmable processor, including a machine-readable medium which receives machine instructions as machine-readable signals. The term "machine-readable signal" refers to any signal for supplying machine instructions and/or data to a programmable processor.

To provide interaction with the user, the system and technology described herein may be implemented on a computer having: a display device (e.g., a CRT (cathode ray tube) or an LCD (liquid crystal display) monitor) for displaying information to the user; and a keyboard and a pointing device (e.g., a mouse or a trackball), through which the user may supply an input to the computer. Devices of other kinds may also be used for providing interaction with the user; for example, a feedback provided to the user may be a sensory feedback (e.g., a visual feedback, an auditory feedback, or a tactile feedback) in any form; and an input from the user may be received in any form (including an acoustic input, a voice input, or a tactile input).

The system and technology described herein may be implemented on a computing system (for example, serving as a data server) including background components, or a computing system (e.g., an application server) including intermediate components, or a computing system (e.g., a user computer having a graphical user interface or a network browser, through which the user may interact with the implementations of the system and technology described herein) including front-end components, or a computing system including any combination of such background components, intermediate components or front-end components. The components of the system may be connected through digital data communication (e.g., a communication network) in any form or via any medium. Examples of the communication network include: the local area network (LAN), the wide area network (WAN) and the Internet.

The computer system may include a client and a server. The client and the server are generally away from each other, and generally perform interaction over a communication network. A relation between the client and the server is generated by computer programs running on respective computers and having a client-server relation with each other.

According to the present application, the video playing operation is detected in the target operation mode. In the target operation mode, the audio is continuously acquired to obtain an audio stream, and the information stream is acquired. The information stream is obtained by performing the speech recognition on the audio stream. The video playing interface is provided in response to the video playing operation, to play a video on the video playing interface. On the video playing interface, the first element is partially hidden and the second element is displayed. The first element is configured to indicate that the audio is continuously acquired, and the second element is displayed based on the information stream. In this manner, in the target operation mode, in addition to the video playing interface, the part of the first element and the second element are displayed on a screen of the electronic device, to reduce the occlusion of the video playing interface, thereby improving immersive viewing experience of the user. In addition, the part of the first element is displayed on the video playing interface, such that the user may determine that the electronic device is listening. The control instruction or the interaction demand may be inputted in voice, without needing to repeatedly wake up the electronic device, thereby improving uses experience.

It should be noted that, the flows in various forms as shown above may be used to re-order, add or delete steps. For example, the respective steps disclosed in the present application may be executed in parallel, may also be executed sequentially and may also be executed in different orders, as long as the result desired by the technical solution disclosed in the present application can be realized, and no limitation will be made herein.

The above specific embodiments do not constitute limitations to the scope of protection of the present application. Those skilled in the art should appreciate that, various modifications, combinations, sub-combinations and substitutions may be carried out depending on design requirements and other factors. Any modification, equivalent substitution and improvement and the like carried out within the spirit and principle of the present application should be covered within the scope of protection of the present application.

What is claimed is:

1. A video playing method, comprising:
   detecting a video playing operation in a target operation mode; wherein, in the target operation mode, audio is continuously acquired to obtain an audio stream and an information stream is acquired by performing speech recognition on the audio stream;
   providing a video playing interface in response to the video playing operation, to play a video on the video playing interface;
   obtaining intermediate recognition information by performing speech recognition on a first Portion of the information stream;
   obtaining a second portion of the information stream based on semantic information of intermediate recognition information being inconsistent, wherein the second portion of the information stream contains the first portion of the information stream;
   obtaining final recognition information by performing the speech recognition on the second portion of the information stream, wherein the semantic information of the final recognition information is consistent;
   acquiring a control intention text from the final recognition information based on an intention of the final recognition information matches a control intention; and
   displaying a part of a first element and displaying the control intention text without changing the video playing interface to reduce occlusion of the video playing interface by the first element, in response to the video playing operation, the first element is configured to indicate that the audio is continuously acquired.

2. The video playing method according to claim 1, wherein providing the video playing interface in response to the video playing operation comprises:
   setting a position of displaying the first element on the video playing interface in response to the video playing operation; and
   displaying the first element on the video playing interface based on the position.

3. The video playing method according to claim 2, wherein the first element comprises a body region and a halo region surrounding the body region; and on the video playing interface, the body region and a part of the halo region are hidden.

4. The video playing method according to claim 1, wherein providing the video playing interface in response to the video playing operation comprises:
   hiding an element for displaying a guide word on the video playing interface in response to the video playing operation;
   wherein, the guide word is configured to indicate a control intention executable.

5. An electronic device, comprising:
   at least one processor; and
   a memory communicatively connected with the at least one processor;
   wherein, the memory is configured to store instructions executable by the at least one processor, the instructions are executed by the at least one processor such that the at least one processor is configured to:
   detect a video playing operation in a target operation mode; wherein, in the target operation mode, audio is continuously acquired to obtain an audio stream and an information stream is acquired by performing speech recognition on the audio stream;
   provide a video playing interface in response to the video playing operation, to play a video on the video playing interface;
   obtain intermediate recognition information by performing speech recognition on a first Portion of the information stream;
   obtain a second portion of the information stream based on semantic information of intermediate recognition information being inconsistent, wherein the second portion of the information stream contains the first portion of the information stream;
   obtain final recognition information by performing the speech recognition on the second portion of the information stream, wherein the semantic information of the final recognition information is consistent;
   acquire a control intention text from the final recognition information based on an intention of the final recognition information matches a control intention; and
   display a part of a first element and displaying the control intention text without changing the video playing interface to reduce occlusion of the video playing interface by the first element, in response to the video playing operation, the first element is configured to indicate that the audio is continuously acquired.

6. The electronic device according to claim 5, wherein the at least one processor is further configured to:
set a position of displaying the first element on the video playing interface in response to the video playing operation; and
display the first element on the video playing interface based on the position.

7. The electronic device according to claim 6, wherein the first element comprises a body region and a halo region surrounding the body region; and on the video playing interface, the body region and a part of the halo region are hidden.

8. The electronic device according to claim 5, wherein the at least one processor is further configured to:
hide an element for displaying a guide word on the video playing interface in response to the video playing operation;
wherein, the guide word is configured to indicate a control intention executable.

9. A non-transitory computer-readable storage medium, having computer instructions stored thereon, wherein the computer instructions are executed by a computer, such that the computer is configured to execute a video playing method, the method comprises:
detecting a video playing operation in a target operation mode; wherein, in the target operation mode, audio is continuously acquired to obtain an audio stream and an information stream is acquired by performing speech recognition on the audio stream;
providing a video playing interface in response to the video playing operation, to play a video on the video playing interface;
obtaining intermediate recognition information by performing speech recognition on a first Portion of the information stream;
obtaining a second portion of the information stream based on semantic information of intermediate recognition information being inconsistent, wherein the second portion of the information stream contains the first portion of the information stream;
obtaining final recognition information by performing the speech recognition on the second portion of the information stream, wherein the semantic information of the final recognition information is consistent;
acquiring a control intention text from the final recognition information based on an intention of the final recognition information matches a control intention; and
display a part of a first element and displaying the control intention text without changing the video playing interface to reduce occlusion of the video playing interface by the first element, in response to the video playing operation, the first element is configured to indicate that the audio is continuously acquired.

10. The non-transitory computer-readable storage medium according to claim 9, wherein providing the video playing interface in response to the video playing operation comprises:
setting a position of displaying the first element on the video playing interface in response to the video playing operation; and
displaying the first element on the video playing interface based on the position.

11. The non-transitory computer-readable storage medium according to claim 10, wherein the first element comprises a body region and a halo region surrounding the body region; and on the video playing interface, the body region and a part of the halo region are hidden.

12. The non-transitory computer-readable storage medium according to claim 9, wherein providing the video playing interface in response to the video playing operation comprises:
hiding an element for displaying a guide word on the video playing interface in response to the video playing operation;
wherein, the guide word is configured to indicate a control intention executable.

* * * * *